(12) United States Patent
Barford

(10) Patent No.: US 6,816,988 B2
(45) Date of Patent: Nov. 9, 2004

(54) METHOD AND SYSTEM FOR MINIMAL-TIME BIT-ERROR-RATE TESTING

(75) Inventor: Lee A. Barford, San Jose, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 455 days.

(21) Appl. No.: 09/944,740

(22) Filed: Aug. 31, 2001

(65) Prior Publication Data

US 2003/0065990 A1 Apr. 3, 2003

(51) Int. Cl.$^7$ .................................................. G06F 11/00
(52) U.S. Cl. ...................... 714/704; 714/715; 714/824; 370/242
(58) Field of Search ........................... 398/27; 714/704, 714/715, 824; 370/242

(56) References Cited

U.S. PATENT DOCUMENTS

| | | | | |
|---|---|---|---|---|
| 4,387,461 A | * | 6/1983 | Evans ........................ | 714/704 |
| 5,623,497 A | * | 4/1997 | Shimawaki et al. ......... | 714/704 |
| 5,761,216 A | * | 6/1998 | Sotome et al. .............. | 714/738 |
| 6,072,779 A | * | 6/2000 | Tzannes et al. ............. | 370/252 |
| 6,310,911 B1 | * | 10/2001 | Burke et al. ................ | 375/224 |

OTHER PUBLICATIONS

"Derivatives of the Incomplete Beta Function", Robert J. Boik, Mar. 15, 1998, file location: http://www.jstatsoft.org/v03/i01/beta.der.pdf.*
"Use of Bayes' Theorem and the Beta Distribution for Reliability Estimation Purposes", M. Shaw, Reliability Engineering—System Safety (UK), vol. 31, No. 2, pp 145–153.*
"Solving for the Paramaters of a Beta Distribution Under Two Quantile Constraints", Van Dorp et al., 2000, Journal of Statistical Computation and Simulation, 2000, vol. 67, pp 189–201.*
"Papers on Probability, Statistics and Statistical Physics", E.T.Jaynes, 1976, pp 149–189, D. Reidel Publisher.*
"Need to Test BER?", Agilent Technologies, Mar. 2000, http://cp.literature.agilent.com/litweb/pdf/5968-9250E.pdf.*
"Sensitivity Analysis for Probability Assessments in Bayesian Networks", K.B.Lakey, Jul. 11, 1993, Uncertainty in Artificial Intelligence Proceedings (1993, pp 136–142.).*
E.T. Janynes, "9. Confidence Intervals vs. Bayesian Intervals (1976)", pp. 149–189, "E.T. Jaynes: Papers on Probability, Statistics and Statistical Physics," D. Reidel Publishing Company.

* cited by examiner

*Primary Examiner*—Guy J. Lamarre
*Assistant Examiner*—John P. Trimmings

(57) ABSTRACT

A bit-error rate is tested in a minimal necessary time period. A block of bits is measured and a cumulative number of bit errors is counted in parallel with calculation of a posterior cumulative distribution function. The posterior cumulative distribution function permits a determination to a desired probability whether or not the bit-error rate is less than a desired bit-error-rate limit. The measurement of blocks of bits and accumulation of bit errors relating thereto and calculation of the posterior cumulative distribution function and making of determinations based thereon continue in parallel until one of three events is detected. The three events are: 1) the bit-error rate is less than the desired bit-error rate limit to the desired probability; 2) the bit-error rate is greater than or equal to the desired bit-error rate limit to the desired probability; and 3) a maximal test time has been reached. Upon detection of any of these three conditions, the test is stopped.

60 Claims, 1 Drawing Sheet

METHOD AND SYSTEM FOR MINIMAL-TIME BIT-ERROR-RATE TESTING

BACKGROUND

1. Technical Field of the Invention

The present invention relates in general to the field of bit-error-rate-testing, and in particular, by way of example but not limitation, to bit-error-rate-testing using statistical analysis.

2. Description of Related Art

Determination of a bit-error rate for a device under test (DUT) has many applications, including, but not limited to, testing of devices in a manufacturing context. A device under test, can be, for example, a digital communication device, system, or channel. Measurements of bit errors of a device under test typically involves inputting a sequence of bits to the device under test and comparing an output of the device to a known correct result in order to determine a number of bit errors from the device. A typical bit-error-testing system tests correct transmission through the device under test of some number of bits (N) and counts a number of incorrectly received bits (R) resulting from the transmission of the N bits.

A number of bit-error-rate-test procedures have been developed. A first such procedure involves testing of a fixed number of bits. In this procedure, N bits are chosen to test. R incorrect bits are counted. A bit-error rate estimate is then calculated as R/N. The test is considered to have been passed if R/N is less than or equal to a bit-error-rate test limit (L). The test is considered to have been failed if R/N is greater than L.

A drawback of this procedure is that there is no straightforward relationship between a value chosen for N and the accuracy of the bit-error rate estimate R/N. Rules of thumb are inevitably used to select N, which leads either to unnecessarily long test times or to a bit-error-rate estimate that is inaccurate.

A second procedure for bit-error-rate testing involves testing the device under test until a fixed number of errors have been counted. In this procedure, bits are counted until R incorrect bits are counted or until a maximal test time (T) is reached. This procedure suffers from the same disadvantages as the first procedure. Again, there is no straightforward relationship between R and T and the accuracy of the test. Rules of thumb are inevitably used to select R and T, which leads to either unnecessarily long test times or to inaccurate test results.

A third procedure for bit-error-rate testing includes density estimation and extrapolation. In this procedure, a time delay between transmission of a bit into a device under test and the bit being read out of the device under test is varied between 0 and 0.5 bit times. A number of erroneous bits at different bit time offsets is counted, which can be used to create a probability density estimate of bit-error rate as a function of offset.

The density estimate is accurate in a region near 0.5 bit time. The density estimate is extrapolated back to zero offset, which results in an estimate of the bit-error rate. A disadvantage of the third procedure is that it depends on an extrapolation of an estimated function far from where measured data is available. Accuracy is therefore suspect. In addition, it is not possible to calculate a complete density estimate quickly enough for practical applications. Therefore, various approximation methods are used, such as, for example, fitting only one mode of the density with a Gaussian. Density estimation and extrapolation methods are often used because they are called for in test standards.

Each of the procedures mentioned above has a drawback in that it is impossible to know how long to measure bit errors so as to obtain a sufficiently accurate decision about whether or not the bit-error rate is low enough. Therefore, use of any of the procedures described above often results in either unnecessarily long test times or inaccurate test results. Moreover, it is impossible to know whether the test time is too long or if the test results are inaccurate. Another drawback of the procedures described above is that the do not permit prior information regarding the bit-error rate to be taken in to account in order to minimize measurement time and maximize throughput. Another drawback of the procedures described above is that they do not provide a direct means of establishing the accuracy of the bit-error-rate testing.

There is accordingly a need for a method and system for minimal-time bit-error-rate-testing that solves these and other drawbacks associated with the prior art.

SUMMARY OF THE PRESENT INVENTION

These and other deficiencies of the prior art are overcome by the present invention. In a first embodiment of the present invention, a method of performing a bit-error-rate-test is provided. This embodiment includes the steps of calculating a posterior cumulative distribution function (pcdf) of a bit-error rate based on a cumulative number of measured incorrect bits and determining whether pcdf is greater than or equal to a desired probability (C) that the bit-error rate is less than a bit-error rate test limit (L). The test is passed and stopped in response to a determination that pcdf is greater than or equal to C. If it is determined that 1−pcdf is greater than or equal to C, the test fails and is stopped. The test also fails and is stopped in response to a determination that the amount of time that the test is taking exceeds a maximum test time (T). The above-listed steps are repeated in response to a determination that pcdf is less than C and that 1−pcdf is less than C.

In another embodiment of the present invention, an article of manufacture that performs a bit-error-rate test includes at least one computer readable medium and processor instructions contained on the at least one computer readable medium. The processor instructions are configured to be readable from the at least one computer readable medium by at least one processor. The instructions cause the at least one processor to calculate a posterior cumulative distribution function (pcdf) of a bit-error rate based on a cumulative number of measured incorrect bits and determine whether pcdf is greater than or equal to a desired probability (C) that the bit-error rate is less than a bit-error-rate test limit (L).

The processor is also made to operate to designate that the test has passed and to stop the test in response to a determination that pcdf is greater than or equal to C. The processor also operates to determine whether 1−pcdf is greater than or equal to C and to designate that the test has failed and stop the test in response to a determination that 1−pcdf is greater than or equal to C. The processor also operates to designate that the test has failed and stop the test in response to a determination that the test time exceeded a maximum test time (T). The processor operates to repeat the above-listed steps in response to a determination that pcdf is less than C and that 1−pcdf is less than C.

In yet another embodiment of the present invention, a system adapted to perform a bit-error-rate test includes a bit-sequence generator adapted to input a bit sequence to a device under test (DUT) and a delay generator interoperably connected to the bit-sequence generator. A comparator is interoperably connected to the DUT and to the delay generator. The comparator is adapted to compare an output of the delay generator to an output of the DUT. A counter is interoperably connected to the comparator and is adapted to count an output of the comparator. The output is a cumulative number of incorrect bits.

A control computer is interoperably connected to the counter and is adapted to calculate a posterior cumulative distribution function (pcdf) of a bit-error rate based on the cumulative number of incorrect bits. The control computer also determines whether pcdf is greater than or equal to a desired probability (C) that the bit-error rate is less than a bit-error-rate test limit (L). The control computer designates whether the test passed and stops the test in response to a determination that pcdf is greater than or equal to C. The control computer determines whether 1−pcdf is greater than or equal to C and designates that the test has failed and stops the test in response to a determination that 1−pcdf is greater than or equal to C. The control computer designates that the test has failed and stops the test in response to a determination that the test time has exceeded the maximum test time (T) and also repeats the above-listed steps in response to a determination that pcdf is less than C and that 1−pcdf is less than C.

The above-described and other features of embodiments of the present invention are explained in detail below with reference to illustrative examples shown in the accompanying Drawings. Those of ordinary skill in the art will appreciate that the described embodiments are provided for purposes of illustration and understanding and that numerous equivalent embodiments are also contemplated in this patent application.

BRIEF DESCRIPTION OF THE DRAWINGS

A more complete understanding of embodiments of the present invention can be achieved by reference to the following Description when taken in conjunction with the accompanying Drawings wherein.

DETAILED DESCRIPTION OF THE EXEMPLARY EMBODIMENTS OF THE INVENTION

In the following Description, for purposes of explanation and not limitation, specific details are set forth in order to provide a thorough understanding of embodiments of the present invention. However, it will be apparent to those of ordinary skill in the art that the present invention can be practiced in other embodiments that depart from these specific details. In other instances, detailed descriptions of well-known methods, devices, logical code (e.g., hardware, software, firmware), and the like are omitted so as not to obscure description of embodiments of the present invention with unnecessary detail. Preferred embodiments of the present invention and its advantages are best understood by referring to FIGS. 1–3 of the Drawings.

There has been a revolution in the application of Bayesian methods to statistics, data analysis, and artificial intelligence. Bayesian methods have been increasingly recognized as powerful techniques that permit correct deductions to be made based on uncertain information. Bayesian methods are also often more straightforward to apply than orthodox statistical inference procedures. In addition, Bayesian methods permit a priori knowledge to be correctly and fully applied to making the deductions.

Many measurement and testing applications take inherently uncertain information (e.g., measurements and tests) and calculate information based thereon. Bayesian methods provide a consistent framework for integrating multiple measurements, tests, and a priori knowledge. The information thus deduced carries with it further information about its own uncertainty.

Traditional probability and statistics consider probability to be a measure of the frequencies of occurrence of various events in repeated experiments. In contrast, Bayesian statistics consider probability to be a measure of the uncertainty in the state of knowledge that an objective reasoner has about a particular assertion, given all available relevant pieces of uncertain knowledge. In other words, Bayesian statistics consider probability to be a logic for reasoning given uncertain knowledge.

Bayesian statistical calculations can be computationally intensive. However, the continued exponential growth of processing power as a function of cost has made them much more practical for many different data analysis problems in diverse areas of physical measurement and signal and image processing than was possible in the past. Bayesian statistical methods' use of probability-theory-as-logic further provides a computationally-efficient approach to sequentially testing a device so that the test can be terminated as soon as the device under test is known with enough confidence to have a sufficiently low bit-error rate. Most typically, available a priori knowledge is taken fully into account in order to minimize expected test times.

Figure 1:
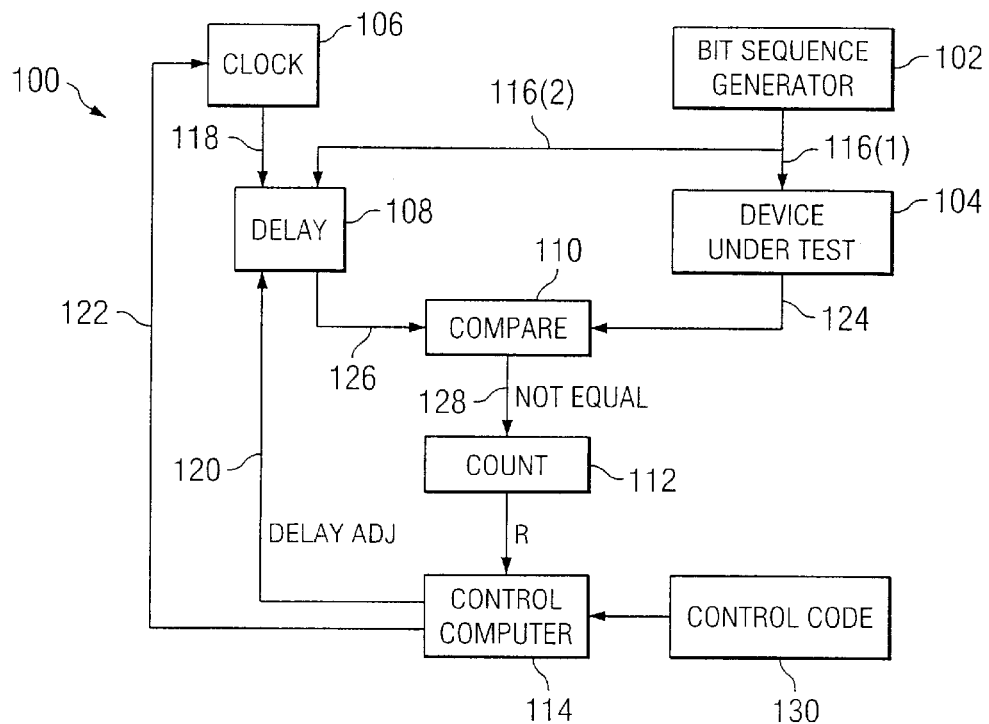
FIG. 1 is a block diagram that illustrates a bit-error-rate test system.

FIG. 1 is a block diagram that illustrates a bit-error-rate test system 100 in accordance with embodiments of the present invention. The system 100 includes a bit-sequence generator 102, a device under test (DUT) 104, a clock 106, a delay generator 108, a comparator 110, a counter 112, and a control computer 114.

The bit-sequence generator 102 inputs a stream 116(1) of N bits to the device under test 104. The bit-sequence generator 102 also provides an identical stream of N bits 116(2) as provided to the device under test 104 to the delay generator 108. The delay generator 108 also receives input 118 from the clock 106 in order to maintain synchronization of the system 100 and to maintain control by the control computer 114 of delays introduced by the delay generator 108. The control computer 114 is interoperably connected to the delay generator 108 via a connection 120 for purposes of delay adjustments and is also interoperably connected to the clock 106 via a connection 122.

In response to the input of the N-bit stream 116(1) by the bit-sequence generator 102, the device under test 104 outputs an N-bit stream 124 to the comparator 110. The delay generator 108 outputs to the comparator 110 a bit stream 126, which is a delayed version of the N-bit stream 116(2) from the bit-stream generator 102. The comparator 110 compares the N-bit stream 124, from the device under test 104, to the N-bit stream 126, from the delay generator 108, and creates an output 128 to the counter 112 that corresponds to each delayed bit from the delay generator 108 that does not match its corresponding bit from the device under test 104. These mismatches represent a total number of bit errors (R) by the device under test 104. The counter 112 counts the total of bit errors R and outputs this total R to the control computer 114.

FIG. 1 illustrates that a stream of N bits is input to a device under test and compared to an output of the device under test. Bit errors are determined by a comparator and a bit-error total R is counted by a counter. The counter outputs the total R to a control computer.

A method of measuring bit-error rates in accordance with embodiments of the present invention can employ a system such as that illustrated in FIG. 1. An example of a system similar to that shown in FIG. 1 is the Agilent 81250 Parallel Bit-Error-Rate Tester. Commonly-used bit-error test systems permit measurement of a fixed number of bits, wherein N denotes a number of bits tested and R denotes a number of incorrect bits counted. A bit-error rate ρ and confidence intervals thereon can be calculated using embodiments of the present invention. For example, a commonly-used bit-error test system could be adapted to calculate the bit-error rate and confidence intervals by including control code 130 according to some embodiments of the invention. Embodiments of the present invention minimize the time required to establish ρ to within some predetermined confidence intervals.

Figure 2:
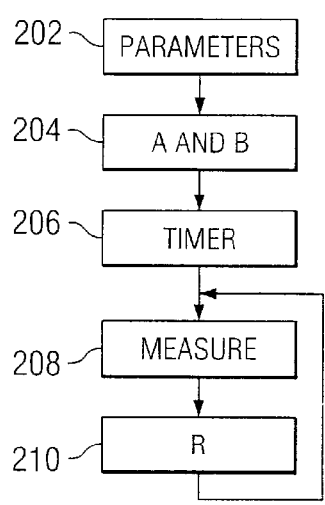
FIG. 2 is a flow chart that illustrates bit-error measurement in connection with a bit-error-rate test in accordance with embodiments of the present invention.

FIG. 2 is a flow chart that illustrates bit-error measurement in connection with a bit-error-rate test in accordance with embodiments of the present invention. A flow 200 begins at step 202, wherein test parameters are set. These test parameters can include, for example, a bit-error-rate test limit (L), a desired probability (C) that a bit-error rate of each device under test is less than L, an a priori mean ($\mu$) and an a priori standard deviation ($\sigma$) of the bit-error rate, a bit rate at which the device under test is to be tested (B), and a maximal test time (T). B is usually measured in bits per second. If $\mu$ and/or $\sigma$ cannot be estimated, it is preferable that $\mu$=0.5 and $\sigma$=0.1 be used.

From step 202, execution proceeds to step 204. At step 204, coefficients a and b are calculated, wherein a=s$\mu$ and b=s(1−$\mu$), wherein:

$$s = \frac{\mu(1-\mu) - \sigma^2}{\sigma^2} \quad (1)$$

From step 204, execution proceeds to step 206. At step 206, a timer is started that is used to determine when the maximal test time T has elapsed.

From step 206, execution proceeds to step 208. At step 208, a plurality of n bits is measured, using, for example, a system such as the system 100. The measurement of step 208 results in a number of bit errors. From step 208, execution proceeds to step 210. At step 210, the number of bit errors found at step 208 is counted by, for example, the counter 112 of the system 100, resulting in a value R. From step 210, execution moves to step 208, at which step a second n bits are measured. From step 208, execution proceeds to step 210. At step 210, the value for R is updated by adding the bit errors from the second performance of step 208 to the previous value of R, such that R represents a cumulative number of bit errors counted during the test. The measured bit rate resulting from the flow 200 can be represented by R/N, wherein N=nx and x is a number of times that step 208 has been performed during the test.

FIG. 2 illustrates that, following inputting of parameters and calculation of coefficients a and b, a timer is started. Following starting of the timer, n bits are measured, resulting in R bit errors. A number of bit errors R is counted, after which a second n bits are measured and R is updated by adding the number of bit errors from the second n bits to the previous value of R. The cycle of measurement and accumulation of bit errors continues throughout the test.

Because a bit-error rate is a probability, it must lie between 0 and 1. If an a priori $\mu$ and an a priori $\sigma$ of the bit-error rate of the device under test are known, such as, for example, in a manufacturing situation in which many similar devices have been measured, the a priori $\mu$ and $\sigma$ can be used in accordance with embodiments of the present invention to reduce the amount of time necessary to perform the bit-error-rate testing. The a priori $\mu$ and $\sigma$ can be, for example, measured values or, in the alternative, can be estimates obtained from engineers or other experts familiar with the device under test or similar devices.

The a priori $\mu$ and $\sigma$ can be used in connection with embodiments of the present invention with little risk of adverse consequences in test results because, if $\mu$ or a is slightly incorrect, the measurement time will be impacted only slightly. Moreover, if $\mu$ or $\sigma$ is wildly incorrect, a correct bit-error-rate-measurement will still eventually be obtained. Application of a priori knowledge often reduces the width of the confidence intervals of the bit-error rate. Since measurement time of repeated experiments typically grows quadratically relative to increases in desired accuracy, application of a priori knowledge often results in a reduction of measurement time for a given desired level of accuracy.

Figure 3:
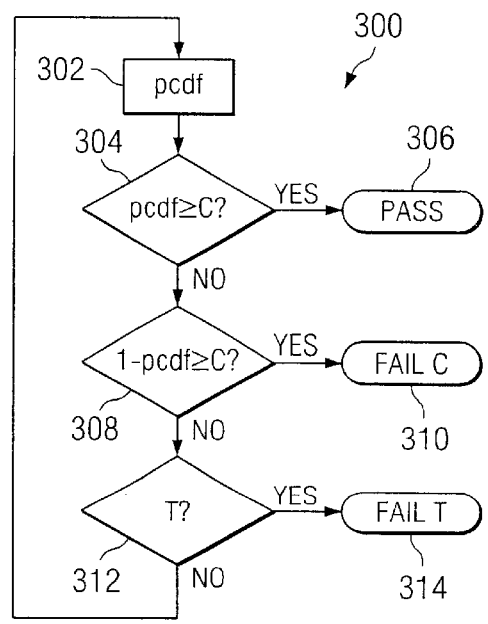
FIG. 3 is a flow chart that illustrates bit-error-rate statistical analysis in connection with a bit-error-rate test in accordance with embodiments of the present invention.

FIG. 3 is a flow chart that illustrates a bit-error-rate statistical analysis in connection with a bit-error-rate test in accordance with embodiments of the present invention. A flow 300 is used to calculate a posterior-cumulative-distribution function (pcdf) of the bit-error rate based on cumulative measured bit errors (R) resulting from the flow 200. In a preferred embodiment, the flow 300 occurs in parallel to steps 208 and 210 of the flow 200. The plurality of bits (n) measured at step 208 is preferably equal to a block, wherein n is equal to a worst-case time for performing the flow 300 multiplied by the bit rate (B), thereby resulting in a pipelining of steps 208 and 210 and the flow 300. In accordance with this preferred embodiment, each time the flow 300 is performed, a new block of n bits has been measured at step 208 and R has been updated. In a preferred embodiment, the flow 300 is performed by the control computer 114.

After steps 208 and 210 have been performed for the first time in the test, the flow 300 begins at step 302, wherein pcdf is calculated. In a preferred embodiment, pcdf equals $$pcdf = \int_o^L Pr(\rho|N,R,I,J) = \int_o^L \rho^{R+a-1}(1-\rho)^{N-R+b-1}d\rho/\text{Beta}(R+a, N-R+b) \quad (2)$$

Beta (a,b) is a Gauss' beta function, which is well known in the art. The pcdf represents a calculation of the probability that the bit-error rate is less than L. If pcdf$\geq$C, the probability that the bit-error rate is less than L is at least as great as the test limit C. In a similar fashion, if 1−pcdf$\geq$C, the proposition that the bit-error rate is greater than L has been determined to the desired probability.

As can been seen from Table 1, N is the number of bits tested and R is the number of incorrect bits counted, ρ is the bit-error rate and I indicates an assumption that the bit incorrectness is an independently-identically-distributed random event that occurs with probability of ρ. J is an assumption that the a priori mean ($\mu$) and the a priori standard deviation ($\sigma$) of ρ are known. K is an assumption that 0<ρ>1. Beta(x,y) is the beta function of Gauss.

TABLE

| Symbol | Meaning |
| --- | --- |
| N | Number of bits tested |
| R | Number of incorrect bits found |
| ρ | Bit-error rate (R/N) |
| I | Assumption: bit incorrectness is i.i.d. |
| J | Assumption: prior mean and variance of ρ known |
| K | Assumption: ρ ∈ (0, 1) |
| Beta (x, y) | Gaussian beta function |

Two exemplary methods of calculating the pcdf are a numerical integration of equation (2) and calculation using an off-the-shelf library function. Some math libraries implement the incomplete Beta function, incomplete Beta (z;c,d), which is defined by:

$$\text{incomplete Beta}(z; c, d) = \frac{\int_o^c u^{c-1}(1-u)^{d-1} du}{\text{Beta}(c, d)} \quad (3)$$

When a library implementation of equation (3) is available, the pcdf (i.e., equation 2) can be calculated as $$pcdf = \text{incomplete Beta } (L; R+a, N-R+b) \quad (4)$$

An example of an incomplete beta function routine is the routine incbet from the C library cephes. Experimental data indicate that use of an incomplete beta function to calculate pcdf is significantly faster than calculation of pcdf using a quadrature code.

In theory, the flow 300, including calculation of the pcdf at step 302, could be performed after each individual bit has been measured. However, calculation of the pcdf in practice takes much longer than the time required to measure a single bit. Because the amount of time necessary to calculate the pcdf does not depend on the number of bits measured, it is preferable to test as many bits as can be tested during the time required to perform the flow 300. This allows the measurement and accumulation steps 208 and 210 to be pipelined with the flow 300 as described hereinabove.

Referring again to FIG. 3, from step 302, execution proceeds to step 304. At step 304, a determination is made whether the pcdf is greater than or equal to C. If so determined, execution proceeds to step 306, wherein the test is stopped and is designated a PASS. If it is not so determined at step 304, execution proceeds to step 308.

At step 308, a determination is made whether I−pcdf≧C. If it is so determined, execution proceeds to step 310, wherein the test is designated a FAIL DUE TO C and the test is stopped. FAIL DUE TO C means that it has been determined to the desired probability that the bit error rate is greater than or equal to the test limit. If it is not so determined at step 308, execution proceeds to step 312. At step 312, a determination is made whether the timer started at step 206 has exceeded T. If it is so determined, execution proceeds to step 314. At step 314, the test is designated FAIL DUE TO TIME and the test is stopped. FAIL DUE TO TIME means that the test has exceeded T without a determination that a PASS or a FAIL DUE TO C has occurred. In a preferred embodiment, T is at least as great as 1500 times the worst-case time for performance of the flow 300 multiplied by the bit rate (B). Whenever the test is stopped at either step 306, step 310, or step 314, both the flow 300 and the flow 200 are stopped and any stored values for T, N, and R are cleared. From step 312, if the timer started at step 206 has not exceeded T, execution moves to step 302.

Embodiments of the present invention permit a bit-error rate to be determined in the minimal time necessary because a bit-error-rate test stops as soon as a conclusion can be drawn to a desired probability that the bit-error rate is or is not sufficiently low. Measuring a minimal number of bits minimizes measurement time and maximizes test throughput. Maximization of throughput is particularly important in manufacturing testing, in which bit-error-rate-testing can potentially become a bottleneck in a manufacturing line. If prior information about an expected normal range of bit-error rates is available, embodiments of the present invention incorporate this information into the decision process regarding how long to test, thereby reducing measurement time and increasing throughput.

Although preferred embodiment(s) of the present invention have been illustrated in the accompanying Drawings and described in the foregoing Description, it will be understood that the present invention is not limited to the embodiment(s) disclosed, but is capable of numerous rearrangements, modifications, and substitutions without departing from the spirit and scope of the present invention as set forth and defined by the following claims.

I claim:

1. A method of performing a bit-error-rate-test comprising the steps of:
    (d) calculating a posterior cumulative distribution function (pcdf) of a bit-error rate based on a cumulative number of measured incorrect bits;
    (e) determining whether pcdf is greater than or equal to a desired probability (C) that the bit-error rate is less than a bit-error-rate test limit (L);
    (f) designating the test to have been passed and stopping the test in response to a determination that pcdf is greater than or equal to C;
    (g) determining whether 1−pcdf is greater than or equal to C;
    (h) designating the test to have been failed and stopping the test in response to a determination that 1−pcdf is greater than or equal to C;
    (i) designating the test to have been failed and stopping the test in response to a determination that a test time has exceeded a maximal test time (T); and
    (j) repeating steps (d)–(i) in response to a determination that pcdf is less than C and that 1−pcdf is less than C.

2. The method of claim 1 further comprising the steps of:
    (a) measuring a plurality of bits;
    (b) determining a cumulative number of measured incorrect bits; and
    (c) in response to step b, repeating steps a and b.

3. The method of claim 2 wherein a number of the plurality of measured bits is set such that an amount of time for steps a and b to be performed is approximately equal to a worst-case time for steps d–i to be performed.

4. The method of claim 3 further comprising the steps of:
    setting a test bit rate; and
    determining the number of the measured plurality of bits by multiplying the test bit rate by the worst-case time.

5. The method of claim 3 wherein, following a first performance of steps a and b, steps a and b are performed in parallel with steps d–i.

6. The method of claim 2 further comprising the steps of:
    setting L;
    setting C;

setting an a priori mean (μ) of the bit-error rate;

setting an a priori standard deviation (σ) of the bit-error rate; and setting T, wherein the setting steps are performed prior to step (a) being performed.

7. The method of claim 6 wherein the a priori mean and the a priori standard deviation are based on historical data or estimation.

8. The method of claim 6 wherein the a priori mean and the a priori standard deviation are set at 0.5 and 0.1, respectively.

9. The method of claim 6 further comprising the step of calculating values a and b, wherein:

$$a = \mu\left[\frac{\mu(1-\mu) - \sigma^2}{\sigma^2}\right]; b = (1-\mu)\left[\frac{\mu(1-\mu) - \sigma^2}{\sigma^2}\right]; \text{ and}$$

μ is the a priori mean and σ is the a priori standard deviation of the bit-error rate.

10. The method of claim 9 wherein the step of calculating the pcdf is performed using a purpose-written code.

11. The method of claim 10 wherein the purpose-written code is an incomplete beta function.

12. The method of claim 1 further comprising the step of calculating values a and b, wherein:

$$a = \mu\left[\frac{\mu(1-\mu) - \sigma^2}{\sigma^2}\right]; b = (1-\mu)\left[\frac{\mu(1-\mu) - \sigma^2}{\sigma^2}\right]; \text{ and}$$

μ is an a priori mean and σ is an a priori standard deviation of the bit-error rate.

13. The method of claim 12 wherein:

$$pcdf = \int_o^L \rho^{R+a-1}(1-\rho)^{N-R+b-1}d\rho/\text{Beta}(R+a, N-R+b).$$

14. The method of claim 13 wherein Beta (a,b) is a Gaussian Beta function.

15. The method of claim 13 wherein the step of calculating the pcdf is performed using a purpose-written code.

16. The method of claim 15 wherein the purpose-written code is an incomplete beta function.

17. The method of claim 1 wherein $$pcdf = \int_o^L \rho^{R+a-1}(1-\rho)^{N-R+b-1}d\rho/\text{Beta}(R+a, N-R+b).$$

18. The method of claim 1 wherein the step of calculating the pcdf is performed using a purpose-written code.

19. The method of claim 18 wherein the purpose-written code is an incomplete beta function.

20. An article of manufacture for performing a bit-error-rate-test, the article of manufacture comprising:

at least one computer readable medium;

processor instructions contained on the at least one computer readable medium, the processor instructions configured to be readable from the at least one computer readable medium by at least one processor and thereby cause the at least one processor to operate as to:

(d) calculate a posterior cumulative distribution function (pcdf) of a bit-error rate based on a cumulative number of measured incorrect bits;

(e) determine whether pcdf is greater than or equal to a desired probability (C) that the bit-error rate is less than a bit-error-rate test limit (L);

(f) designate the test to have been passed and stop the test in response to a determination that pcdf is greater than or equal to C;

(g) determine whether 1−pcdf is greater than or equal to C;

(h) designate the test to have been failed and stop the test in response to a determination that 1−pcdf is greater than or equal to C;

(i) designate the test to have been failed and stop the test in response to a determination that a test time has exceeded a maximal test time (T); and (j) repeat steps (d)–(i) in response to a determination that pcdf is less than C and that 1−pcdf is less than C.

21. The article of claim 20 further comprising processor instructions contained on the at least one computer readable medium, the processor instructions configured to be readable from the at least one computer readable medium by the at least one processor and thereby cause the at least one processor to operate as to:

(a) measure a plurality of bits;

(b) determine a cumulative number of measured incorrect bits; and (c) in response to (b), repeat (a) and (b).

22. The article of claim 21 wherein a number of the plurality of measured bits is set such that an amount of time for (a) and (b) to be performed is approximately equal to a worst-case time for (d)–(i) to be performed.

23. The article of claim 22 further comprising processor instructions contained on the at least one computer readable medium, the processor instructions configured to be readable from the at least one computer readable medium by the at least one processor and thereby cause the at least one processor to operate as to:

set a test bit rate; and determine the number of the measured plurality of bits by multiplying the test bit rate by the worst-case time.

24. The article of claim 22 wherein, following a first performance of (a) and (b), (a) and (b) are performed in parallel with (d)–(i).

25. The system of claim 21 further comprising processor instructions contained on the at least one computer readable medium, the processor instructions configured to be readable from the at least one computer readable medium by the at least one processor and thereby cause the at least one processor to operate as to:

set L;

set C;

set an a priori mean of the bit-error rate;

set an a priori standard deviation of the bit-error rate; and set T, wherein L, C, the a priori mean, the a priori standard deviation, and T are set prior to (a) being performed.

26. The article of claim 25 wherein the a priori mean and the a priori standard deviation are based on historical data or estimation.

27. The article of claim 25 wherein the a priori mean and the a priori standard deviation are set at 0.5 and 0.1, respectively.

28. The article of claim 25 further comprising processor instructions contained on the at least one computer readable medium, processor instructions configured to be readable from the at least computer readable medium by the at least one processor and thereby cause the at least one processor to operate as to:

$$a = \mu\left[\frac{\mu(1-\mu)-\sigma^2}{\sigma^2}\right]; b = (1-\mu)\left[\frac{\mu(1-\mu)-\sigma^2}{\sigma^2}\right]; \text{and}$$

$\mu$ is the a priori mean and $\sigma$ is the a priori standard deviation of the bit-error rate.

29. The article of claim 28 wherein the calculation of the pcdf is performed using a purpose-written code.

30. The article of claim 29 wherein the purpose-written code is an incomplete beta function.

31. The article of claim 20 further comprising processor instructions contained on the at least one computer readable medium, the processor instructions configured to be readable from the at least one computer readable medium by the at least one processor and thereby cause the at least one processor to operate as to:

calculate values a and b, wherein:

$$a = \mu\left[\frac{\mu(1-\mu)-\sigma^2}{\sigma^2}\right]; b = (1-\mu)\left[\frac{\mu(1-\mu)-\sigma^2}{\sigma^2}\right]; \text{and}$$

$\mu$ is an a priori mean and $\sigma$ is an a priori standard deviation of the bit-error rate.

32. The article of claim 31 wherein $pcdf = \int_0^L \rho^{R+a-1}(1-\rho)^{N-R+b-1}d\rho/\text{Beta}(R+a, N-R+b)$.

33. The article of claim 32 wherein the calculation of the pcdf is performed using a purpose-written code.

34. The article of claim 33 wherein the purpose-written code is an incomplete beta function.

35. The article of claim 20 wherein $pcdf = \int_0^L \rho^{R+a-1}(1-\rho)^{N-R+b-1}d\rho/\text{Beta}(R+a, N-R+b)$.

36. The article of claim 20 wherein the calculation of the pcdf is performed using a purpose-written code.

37. The article of claim 36 wherein the purpose-written code is an incomplete beta function.

38. A system configured to perform a bit-error-rate-test, the system comprising:

a bit-sequence generator configured to input a bit sequence to a device under test (DUT);

delay generator interoperably connected to the bit-sequence generator;

a comparator interoperably connected to the DUT and to the delay generator, wherein the comparator is configured to compare an output of the delay generator to an output of the DUT;

a counter interoperably connected to the comparator, wherein the counter is configured to count an output of the comparator, the output being a cumulative number of incorrect bits; and a control computer interoperably connected to the counter, wherein the computer is configured to:

(d) calculate a posterior cumulative distribution function (pcdf) of a bit-error rate based on the cumulative number of incorrect bits;

(e) determine whether pcdf is greater than or equal to a desired probability (C) that the bit-error rate is less than a bit-error-rate test limit (L);

(f) designate the test to have been passed and stop the test in response to a determination that pcdf is greater than or equal to C;

(g) determine whether 1−pcdf is greater than or equal to C;

(h) designate the test to have been failed and stop the test in response to a determination that 1−pcdf is greater than or equal to C;

(i) designate the test to have been failed and stop the test in response to a determination that a test time has exceeded a maximal test time (T); and (j) repeat (d)–(i) in response to a determination that pcdf is less than C and that 1−pcdf is greater than C.

39. The system of claim 38 wherein the computer is further configured to:

(a) measure a plurality of bits;

(b) determine a cumulative number of measured incorrect bits; and (c) in response to (b), repeat (a) and (b).

40. The system of claim 39 wherein a number of the plurality of measured bits is set such that an amount of time for (a) and (b) to be performed is approximately equal to a worst-case time for (d)–(i) to be performed.

41. The system of claim 40 wherein the computer is further configured to:

set a test bit rate; and determine the number of the measured plurality of bits by multiplying the test bit rate by the worst-case time.

42. The system of claim 40 wherein, following a first performance of (a) and (b), (a) and (b) are performed in parallel with (d)–(i).

43. The system of claim 39 wherein the computer is further configured to:

set L;

set C;

set an a priori mean of the bit-error rate;

set an a priori standard deviation of the bit-error rate; and set T, wherein L, C, the a priori mean, the a priori standard deviation, and T are set prior to (a) being performed.

44. The system of claim 43 wherein the a prior mean and the a priori standard deviation are based on historical data or estimation.

45. The system of claim 43 wherein the a priori mean and the a priori standard deviation are set at 0.5 and 0.1, respectively.

46. The system of claim 43 wherein the computer is further configured to calculate values a and b, wherein $$a = \mu\left[\frac{\mu(1-\mu)-\sigma^2}{\sigma^2}\right]; b = (1-\mu)\left[\frac{\mu(1-\mu)-\sigma^2}{\sigma^2}\right]; \text{and}$$

$\mu$ is the a priori mean and $\sigma$ is the a priori standard deviation of the bit-error rate.

47. The system of claim 46 wherein the calculation of the pcdf is performed using a purpose-written code.

48. The system of claim 47 wherein the purpose-written code is an incomplete beta function.

49. The system of claim 38 wherein the computer is further configured to calculate values a and b, wherein:

$$a = \mu\left[\frac{\mu(1-\mu)-\sigma^2}{\sigma^2}\right]; b = (1-\mu)\left[\frac{\mu(1-\mu)-\sigma^2}{\sigma^2}\right]; \text{and}$$

$\mu$ is an a priori mean and $\sigma$ is an a priori standard deviation of the bit-error rate.

50. The system of claim 49 wherein $pcdf = \int_0^L \rho^{R+a-1}(1-\rho)^{N-R+b-1}d\rho/\text{Beta}(R+a, N-R+b)$.

51. The system of claim 50 wherein Beta (a,b) is a Gaussian Beta function.

52. The system of claim 50 wherein the calculation of the pcdf is performed using a purpose-written code.

53. The system of claim 52 wherein the purpose-written code is an incomplete beta function.

54. The system of claim 38 wherein $$pcdf = \int_o^L \rho^{R+a-1}(1-\rho)^{N-R+b-1} d\rho / \text{Beta}(R+a, N-R+b).$$

55. The system of claim 38 wherein the calculation of the pcdf is performed using a purpose-written code.

56. The system of claim 55 wherein the purpose-written code is an incomplete beta function.

57. A method, comprising:
   (i) providing a test sequence to a device under test (DUT);
   (ii) recording errors of said DUT that occur in response to said test sequence;
   (iii) calculating a cumulative observed error rate;
   (iv) calculating a first cumulative probability that an error rate of said DUT is less than a threshold value using said cumulative observed error rate, an a priori mean and an a priori standard deviation;
   (v) calculating a second cumulative probability that an error rate of said DUT is greater than a threshold value; and
   (vi) when said first and second cumulative probabilities do not exceed a predetermined confidence value, repeating steps (i)–(v);
   wherein steps (i)–(vi) are performed by a bit-error rate testing device.

58. The method of claim 57 further comprising:
   when one of said first and second cumulative probabilities exceed a predetermined confidence value, terminating testing of said DUT.

59. The method of claim 57 further comprising:
   when a test time exceeds a predetermined amount of time without said first and second cumulative probabilities exceeding a predetermined confidence value, terminating said testing of said DUT and identifying said DUT as a failing device.

60. The method of claim 57 wherein said calculating said first cumulative probability comprises integrating a distribution function.

* * * * *